(12) United States Patent
Huang

(10) Patent No.: US 9,460,567 B2
(45) Date of Patent: Oct. 4, 2016

(54) ESTABLISHING SECURE COMMUNICATION FOR VEHICLE DIAGNOSTIC DATA

(71) Applicant: GM Global Technology Operations LLC, Detroit, MI (US)

(72) Inventor: Stephan Huang, Carmel, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 38 days.

(21) Appl. No.: 14/445,820

(22) Filed: Jul. 29, 2014

(65) Prior Publication Data

US 2016/0035147 A1 Feb. 4, 2016

(51) Int. Cl.
*G01M 17/00* (2006.01)
*G07C 5/00* (2006.01)

(52) U.S. Cl.
CPC ..................... *G07C 5/008* (2013.01)

(58) Field of Classification Search
CPC .... G07C 5/008; G07C 5/0808; G07C 5/085; G07C 2205/02; G06Q 10/06
USPC ............................................ 701/31.4; 726/19
See application file for complete search history.

(56) References Cited

U.S. PATENT DOCUMENTS

| | | | | |
|---|---|---|---|---|
| 6,292,718 B2* | 9/2001 | Staiger | ............................. | 701/1 |
| 7,034,654 B2* | 4/2006 | Forest | ..................... | B60R 25/04 |
| | | | | 307/10.7 |
| 7,764,787 B2* | 7/2010 | Craft | ..................... | G06F 21/123 |
| | | | | 380/28 |
| 8,484,707 B1* | 7/2013 | Bertz | ..................... | B60R 25/24 |
| | | | | 705/65 |
| 8,528,108 B2* | 9/2013 | Ammer | .................. | G06F 21/575 |
| | | | | 713/187 |
| 2001/0032310 A1* | 10/2001 | Corella | .................... | H04L 9/002 |
| | | | | 713/156 |
| 2003/0236991 A1* | 12/2003 | Letsinger | ................ | G06F 21/31 |
| | | | | 726/19 |
| 2004/0138790 A1* | 7/2004 | Kapolka | ................ | G07C 5/008 |
| | | | | 701/29.3 |
| 2005/0065678 A1* | 3/2005 | Smith | ..................... | G07C 5/008 |
| | | | | 701/31.4 |
| 2006/0130033 A1* | 6/2006 | Stoffels | ..................... | G06F 8/61 |
| | | | | 717/166 |
| 2007/0093924 A1* | 4/2007 | Engel | .................. | G05B 23/0267 |
| | | | | 700/104 |
| 2007/0152503 A1* | 7/2007 | Kowalick | .......... | H01R 13/6397 |
| | | | | 307/10.1 |
| 2008/0214022 A1* | 9/2008 | Kowalick | .......... | H01R 13/6397 |
| | | | | 439/34 |

(Continued)

OTHER PUBLICATIONS

Karl Koscher;Experimental Security Analysis of a Modern Automobile; Year: 2010; IEEE, University of Washington; pp. 1-16.*

(Continued)

*Primary Examiner* — Shardul Patel
(74) *Attorney, Agent, or Firm* — Christopher DeVries Reising Ethington P.C.

(57) ABSTRACT

A vehicle diagnostic communication system and a method of establishing a secure diagnostic session at a vehicle is disclosed. The method includes the steps of: providing a seed value from an electronic control unit (ECU) to a vehicle diagnostics tool; determining a first challenge response at the diagnostics tool, a remote server coupled to the diagnostics tool, or both, wherein the first challenge response is calculated using the seed value and one or more iterations of a key derivation function; providing the first challenge response to the ECU; and if the first challenge response is validated at the ECU, conducting a diagnostic session between the diagnostics tool and the ECU.

13 Claims, 6 Drawing Sheets

(56) References Cited

U.S. PATENT DOCUMENTS

| | | | |
|---|---|---|---|
| 2011/0138188 A1* | 6/2011 | Lee | G06F 21/57 713/187 |
| 2012/0095642 A1* | 4/2012 | Nishida | H04L 9/3226 701/31.4 |
| 2013/0031540 A1* | 1/2013 | Throop | G06F 8/665 717/173 |
| 2013/0246135 A1* | 9/2013 | Wang | G07C 5/008 705/14.4 |
| 2014/0109075 A1* | 4/2014 | Hoffman | G06F 8/65 717/169 |
| 2015/0024727 A1* | 1/2015 | Hale-Pletka | H04W 4/008 455/418 |

OTHER PUBLICATIONS

Muhammad Sabir Idrees; Secure Automotive On-Board Protocols: Date: Mar. 23-24, 2011; Springer; A Case of Over-the-Air Firmware Updates; pp. 1-14.*

* cited by examiner

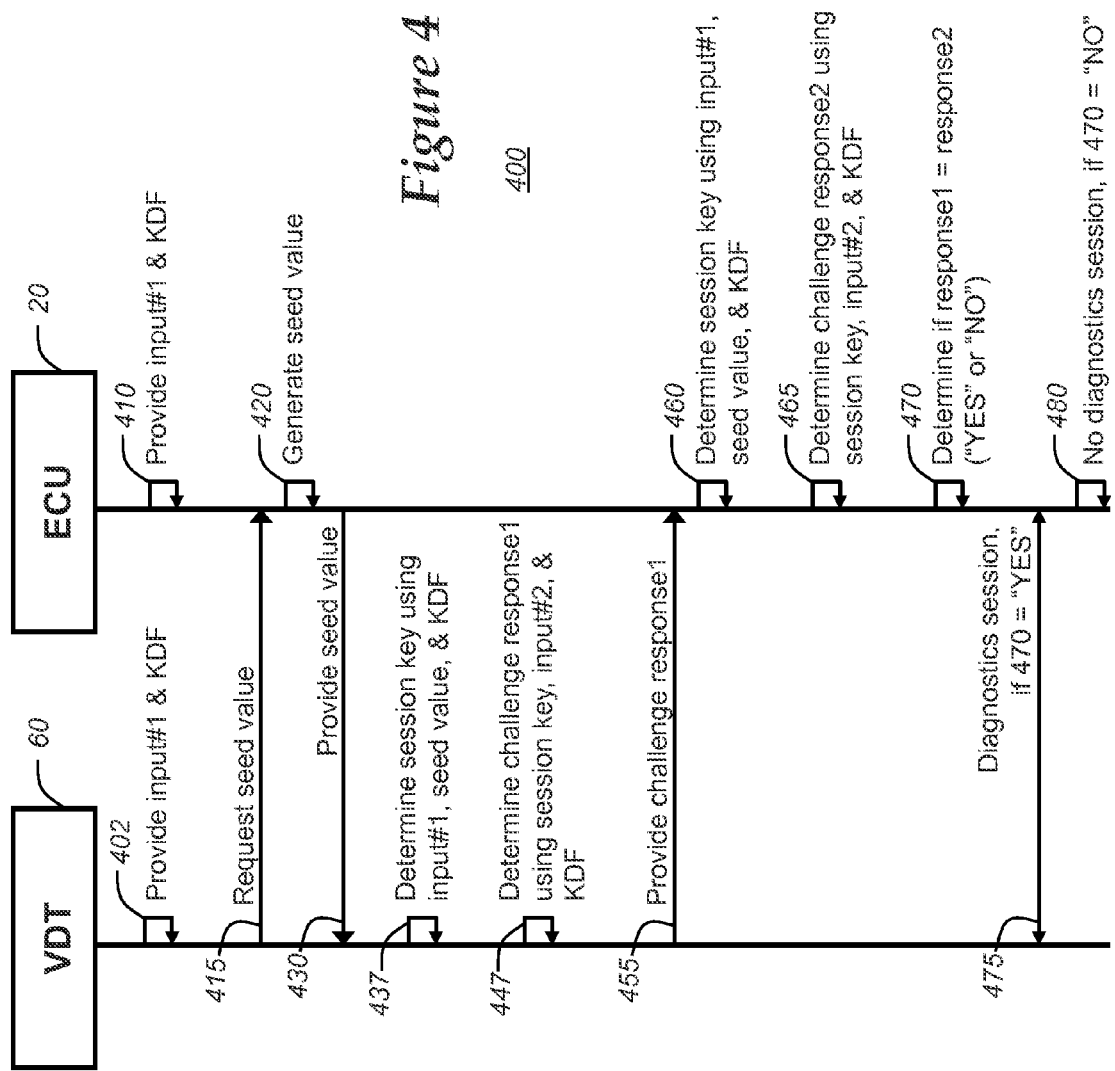

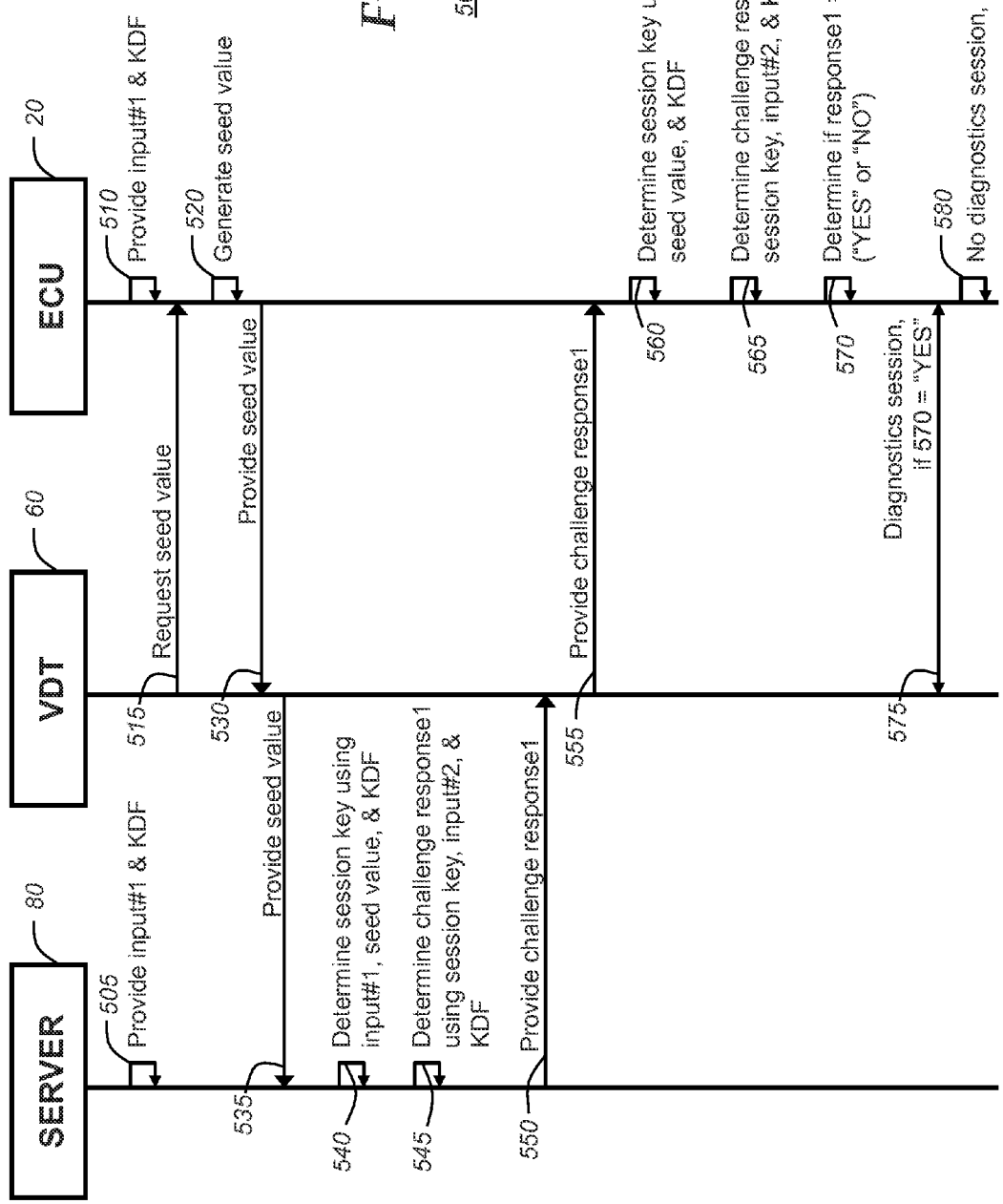

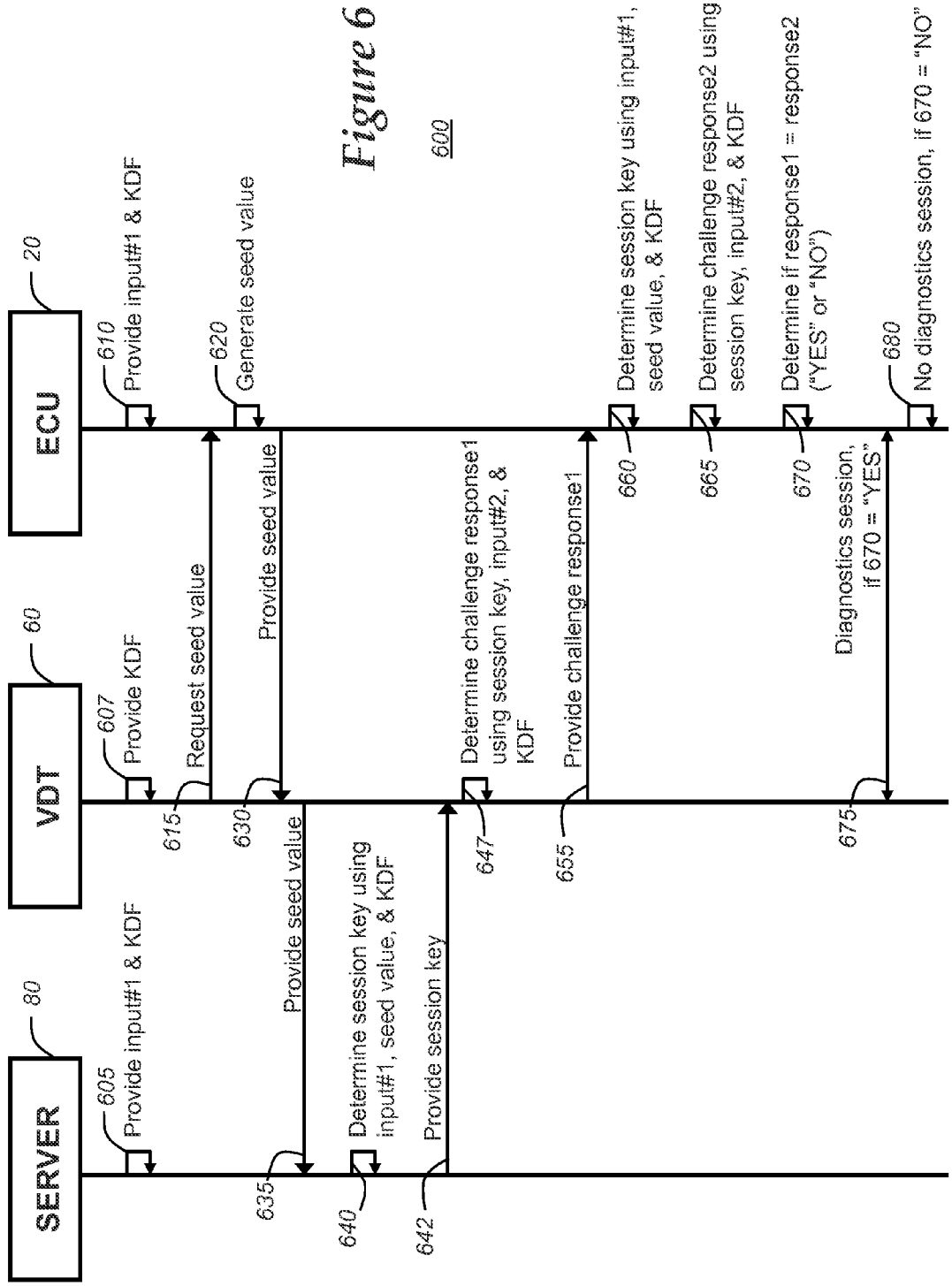

ESTABLISHING SECURE COMMUNICATION FOR VEHICLE DIAGNOSTIC DATA

TECHNICAL FIELD

The present invention relates to establishing secure communication for communication of vehicle diagnostic data.

BACKGROUND

The International Standard Organization (ISO) is a recognized authority for industry standards. ISO-14229 specifies data link requirements of diagnostic services allowing a diagnostic tester or test equipment to control diagnostic functions in a vehicle electronic control unit (ECU); e.g., ECUs associated with electronic fuel injection, automated gear box assemblies, anti-lock braking systems, etc. When the diagnostic test equipment interfaces with one or more ECUs, the test equipment controls communication over the data link—e.g., whether the communication is to stop, pause, or resume.

SUMMARY

According to an embodiment of the invention, there is provided a method of establishing a secure diagnostic session at a vehicle. The method includes the steps of: providing a seed value from an electronic control unit (ECU) to a vehicle diagnostics tool; determining a first challenge response at the diagnostics tool, a remote server coupled to the diagnostics tool, or both, wherein the first challenge response is calculated using the seed value and one or more iterations of a key derivation function; providing the first challenge response to the ECU; and if the first challenge response is validated at the ECU, conducting a diagnostic session between the diagnostics tool and the ECU.

According to another embodiment of the invention, there is provided a method of establishing a secure diagnostic session at a vehicle. The method includes the steps of: receiving at a remote server and via a vehicle diagnostics tool a seed value generated by a vehicle electronic control unit (ECU) coupled to a vehicle bus, wherein the seed value is used to authenticate the diagnostics tool to the ECU; determining a session key using the seed value and a first unique input stored at the remote server; determining a first challenge response using the session key at one of the server or the diagnostics tool; providing the first challenge response to the ECU; and if the first challenge response is validated at the ECU, conducting a diagnostic session between the diagnostics tool and the ECU.

BRIEF DESCRIPTION OF THE DRAWINGS

One or more embodiments of the invention will hereinafter be described in conjunction with the appended drawings, wherein like designations denote like elements, and wherein:

FIG. 4 is a flow diagram illustrating a method of establishing a session key for a diagnostic session;

FIG. 5 is a flow diagram illustrating another method of establishing a session key for a diagnostic session;

FIG. 6 is a flow diagram illustrating another method of establishing a session key for a diagnostic session;

FIG. 7 is a schematic diagram illustrating inputs and an output of a key derivation function (KDF); and.

DETAILED DESCRIPTION OF THE ILLUSTRATED EMBODIMENT(S)

The method(s) described below pertain to vehicle security with respect to a vehicle diagnostics system. More particularly, the method(s) pertain to protecting or securing sensitive information carried by or stored by electronic control units (ECUs) within the vehicle from malicious attackers. The ECUs are typically interconnected to one another and communicate with one another via a vehicle network (e.g., a bus using a controller area network (CAN) protocol). In addition, the ECUs may abide by and/or comply with a vehicle diagnostics protocol. More recently, malicious attackers have determined how to manipulate the diagnostics protocol to access the sensitive information carried by the ECU(s). As will be explained below, using this sensitive information, malicious attackers may access the vehicle without authorization, start the vehicle without authorization, control vehicle movement without authorization, or access a lawful user's private information without authorization, just to name a few examples.

The method(s) described below more particularly pertain to enhancing the security during the establishment of a diagnostic session. During an initiation of the diagnostic session, a diagnostic tool is connected to the vehicle's bus and thereby communicates with one or more electronic control units (ECUs). The data stored by the ECUs may contain sensitive or confidential information or may store less sensitive data. In order to access an ECU carrying sensitive data, the ECU may require special credentials. Typically, the ECU will provide a seed/challenge to the tool which the tool may calculate and then provide a challenge response or session key to the ECU (e.g., a key to allow access to the ECU). The ECU may calculate its own session key and compare its calculation to the challenge response provided by the tool—and if the session keys match, the diagnostic session may be established. If they do not match, no diagnostic session occurs. During this procedure, the tool nakedly may provide the ECU with the correct challenge response (e.g., the session key) over the bus (e.g., a CAN bus). A malicious attacker or hacker at this time may eavesdrop and learning the correct challenge response or session key, may use that information to acquire the sensitive or confidential information stored at the ECU. The method(s) discussed herein enhance the security of these types of diagnostic sessions by allowing the ECU(s) to validate the authenticity of the diagnostics tool without the tool nakedly providing the challenge response over the bus.

Figure 1:
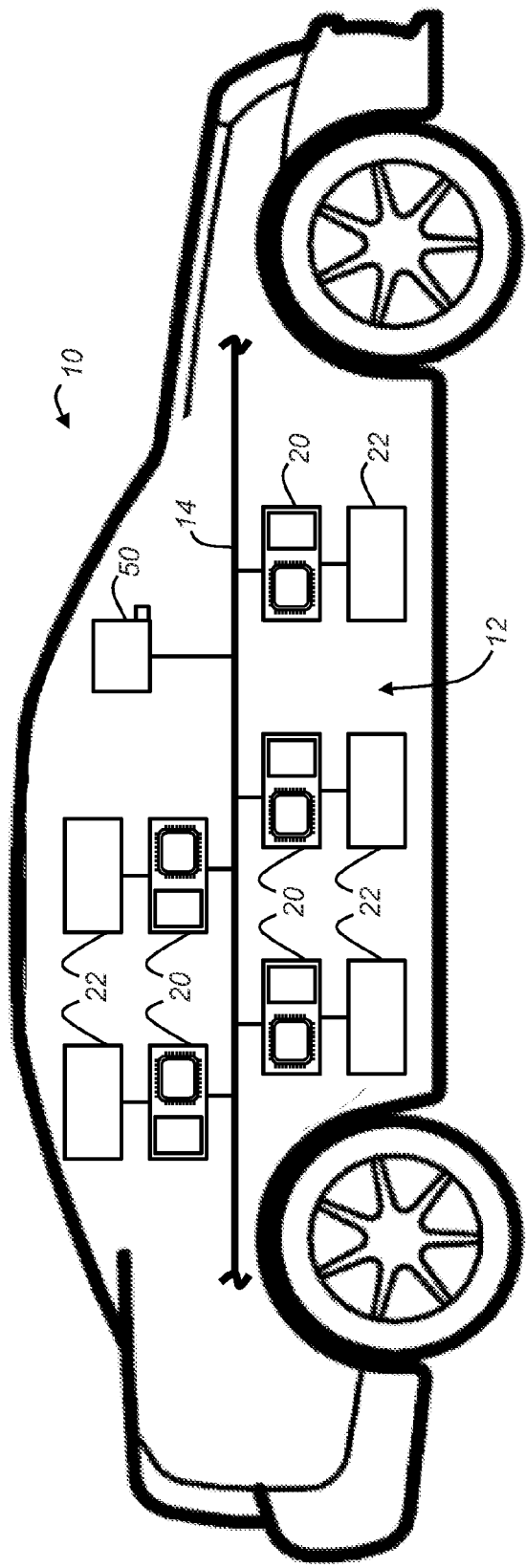
FIG. 1 is a schematic diagram depicting an embodiment of a vehicle communications system.

FIG. 1 illustrates a vehicle 10 having a communication system 12 therein. The communication system 12 may enable wired communication via one or more vehicle buses 14, short range wireless communication (SRWC) using an SRWC chipset 16 (see FIG. 2), or long range, cellular communication using a cellular chipset 18 (see FIG. 2), just to name a few possibilities. The bus(es) 14 and SRWC equipment collectively may be implemented to enable a vehicle local area network (VLAN).

The one or more buses 14 may include communication bus(es), infotainment bus(es), entertainment bus(es), etc. The one or more buses 14 also may be considered diagnostic buses if they are suitably configured to carry diagnostic information stored in the ECUs—regardless of whether the bus(es) also carry other communication, infotainment, or entertainment data. The bus shown in FIG. 1 is connected directly and indirectly to multiple devices. For example, a number of ECUs (20) are coupled directly to the bus 14, which are in turn each coupled to a vehicle system module or vehicle module or device 22 (such that the ECUs may bridge the connection between the bus 14 and devices 22). Together the bus(es) 14 and ECUs 20 communicate via one or more vehicle networks (e.g., suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few).

Figure 2:
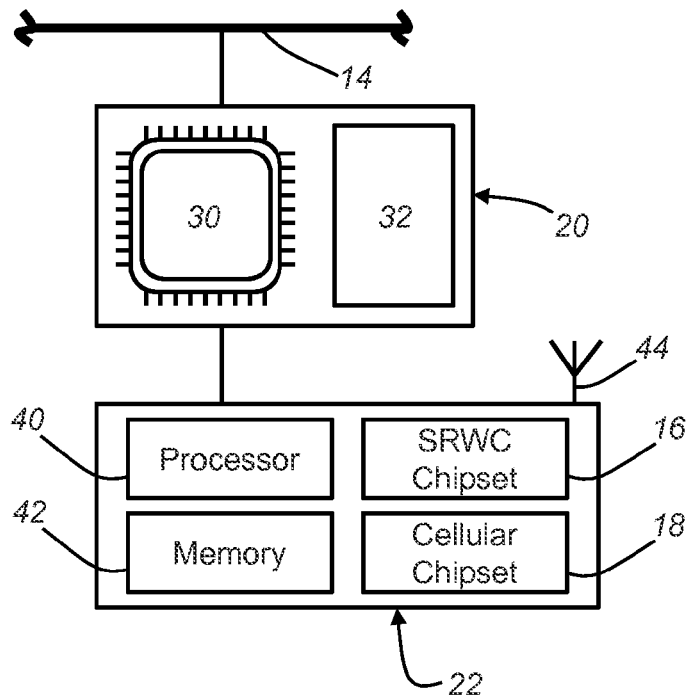
FIG. 2 is an embodiment of a portion of the vehicle communications system shown in FIG. 1.

Each ECU 20 may comprise one or more processing devices or processors 30 and memory or memory devices 32 (see e.g., FIG. 2). Each processor 30 may be any type of device capable of processing electronic instructions including microprocessors, microcontrollers, host processors, controllers, vehicle communication processors, and application specific integrated circuits (ASICs). It can be a dedicated processor used only for the respective ECU (and/or its respective vehicle device 22) or it can be shared with other vehicle systems. Processor 30 executes various types of digitally-stored instructions, such as software or firmware programs stored in memory 32, which enable the vehicle module 22 to provide various services.

The memory 32 may include any suitable computer usable or readable medium, which include one or more storage devices or articles. Exemplary computer usable storage devices include conventional computer system RAM (random access memory), ROM (read only memory), EPROM (erasable, programmable ROM), EEPROM (electrically erasable, programmable ROM), and magnetic or optical disks or tapes. According to one embodiment, the memory 32 may be categorized or divided into identifiable segments carrying or storing diagnostic data or diagnostic services—each segment having or being associated with a cell or address. At least some of the addresses may store sensitive or confidential information relating to the vehicle's operation, user(s), and/or diagnostic data and/or services.

It also should be appreciated that the processor 30 and memory 32 may be configured in software, and at least some of the steps of the method(s) described herein may be performed as one or more computer programs executable by the processor 30 and/or the vehicle module 22, and the various method related data may be stored in any suitable memory. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer usable or readable medium, which include one or more storage devices or articles. It is therefore to be understood that the methods may be at least partially performed by any electronic device(s) capable of executing the above-described functions.

The vehicle modules 22 may be configured to execute various vehicle services. For example, one module may be an engine control module; another may be a powertrain control module. Or for example, one of the vehicle modules 22 may be a telematics unit (as shown in FIG. 2) having the previously mentioned SRWC and cellular chipsets 16, 18, as well as its own processor 40, memory 42, and multi-purpose (or multi-band) antenna 44—among other things. For example, using the SRWC chipset 16, the telematics unit may carry out wireless networking (via the VLAN) according to any suitable, known protocol. Non-limiting examples of SRWC protocols include a Wi-Fi standard (e.g., IEEE 802.11), a Wi-Fi Direct standard, a Bluetooth standard, a WiMAX standard, a ZigBee™ standard, a wireless infrared transmission standard, any other suitable standard, or various combinations thereof.

Of course, wireless networking by the telematics unit may be carried out according to any suitable cellular standard as well. For example, the telematics unit may communicate via GSM, CDMA, or LTE standards, just to name a few. Cellular communication should be construed broadly to include voice calls, data (or packet) calls, or any combination thereof.

The ECU 20 shown in FIG. 2 is coupled between the bus 14 and the telematics unit (22) and may be configured according to any suitable standard—e.g., a conventionally configured ECU; or it may be a dedicated, particularly or specially configured ECU. Thus, the ECU 20 shown in FIG. 2 is illustrative of any or all of the ECUs shown in FIG. 1. It should be appreciated that the ECU 20 may store sensitive data associated with communication over the bus 14 or sensitive data associated with the respective module 22 (e.g., the telematics unit) or both. For example, and as will be explained in greater detail below, the ECU 20 may store and utilize one or more keys for secure bus communication or for communication between the ECU 20 and the respective module 22. Furthermore, skilled artisans will appreciate that a breach of ECU 20 may enable an attacker a suitable opportunity to acquire sensitive data stored within the module 22, enable the attacker to acquire physical access to the vehicle, and even harm the lawful user of the vehicle 10. For example, a breach of the ECU 20 shown in FIG. 2 may enable a malicious attacker opportunity to use the telematics unit to remotely start the vehicle or unlock the vehicle doors, etc.

Figure 3:
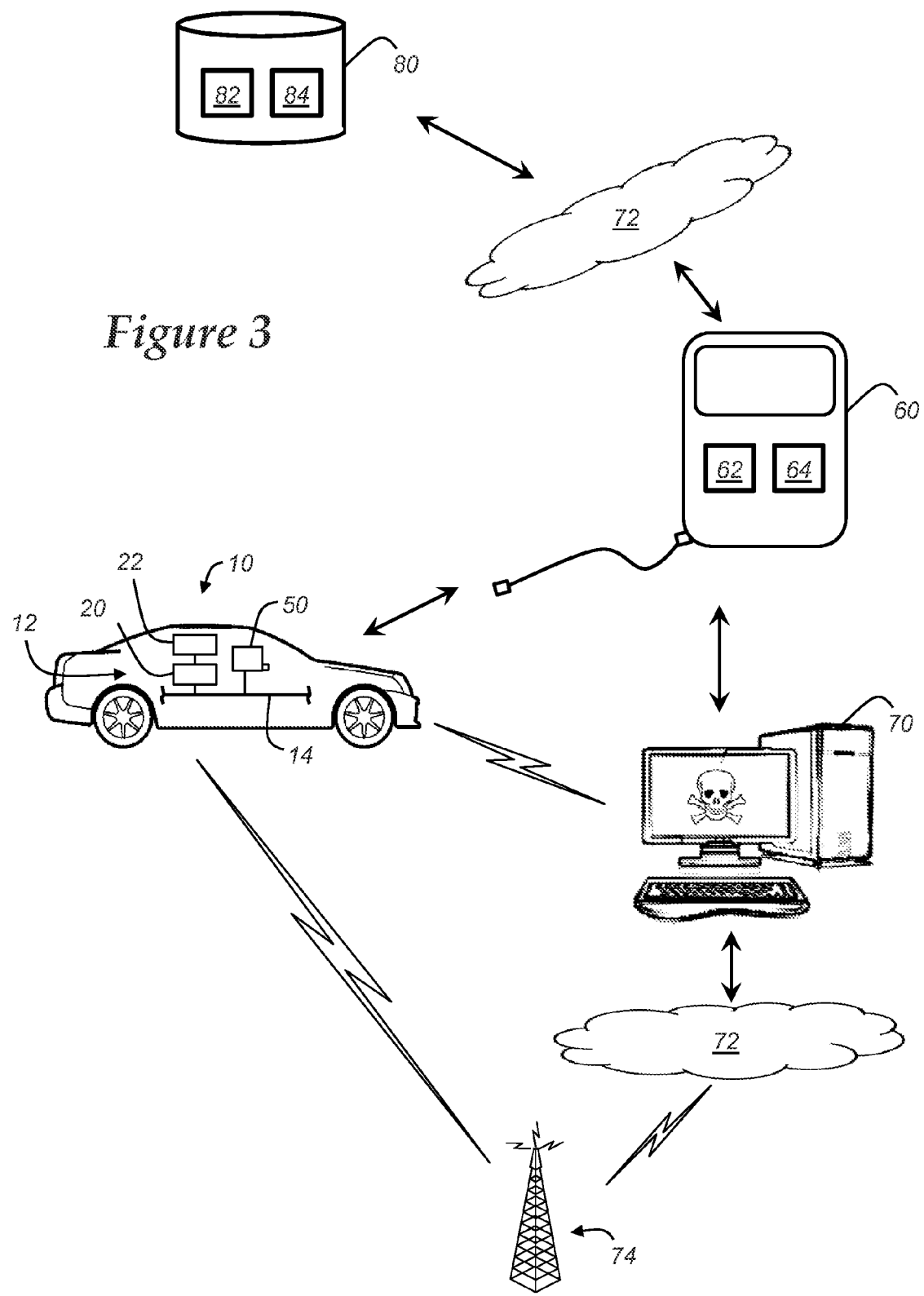
FIG. 3 is a schematic diagram depicting how a malicious attacker might breach the vehicle communications system of FIG. 1.

FIG. 3 (and also FIG. 1) show a diagnostic portal 50 coupled to the bus 14. The portal 50 may be any device for connecting or coupling an external device 60 such as a vehicle diagnostic tool (VDT) or data-logger or other suitable diagnostics machine. In addition, as will be explained in greater detail below, external devices 60 also may include electronic devices used by an attacker to imitate genuine diagnostic tools; e.g., a pseudo-diagnostic tool or remote computer. Genuine VDTs 60, as will be appreciated by skilled artisans, may enable a vehicle technician to connect with the vehicle 10, request diagnostic status, and read the statuses of multiple vehicle modules 22. In addition, it will be appreciated that any external device configured to imitate the genuine VDT (used by an attacker) may perform similar functions as the genuine VDT. The external device 60 may couple by wire or wirelessly with the portal 50 using hardware and techniques familiar to skilled artisans. The VDT 60 is shown having memory 62 in operable communication with one or more processors 64 (here, the memory 62 and processor(s) 64 may function similarly to those described with respect to memory 30 and processor 32 and will not be re-described).

FIG. 3 further illustrates a schematic diagram suggesting a few examples of how a malicious attacker 70 (represented by a networked device) might utilize the communication system 12 in the vehicle 10 to gain unauthorized access to or breach the system 12. For example, the attacker 70 may utilize external device 60 or similar device which is directly coupled to the bus 14 (e.g., via wire or wireless communication). Or the attacker may spoof an external device 60—i.e., pretend to be a genuine diagnostic tool. Or the attacker 70 may utilize a land network 72 and/or a wireless network 74 to breach the bus 14 (e.g., via the telematics unit or other suitable module 22). In any case, once access to the bus 14 is achieved by the malicious attacker 70, the attacker may communicate with the ECUs 20 in order to gather sensitive information.

Lastly, FIG. 3 illustrates a remote server 80 in communication with the VDT 60 using land network 72. The remote server may be any computing device with memory 82. In addition, the server 80 may include one or more processors 84. The memory 82 and processor(s) 84 may function similarly to those described with respect to memory 32 and processor 30 and will not be re-described here. Moreover, the term "remote" may be relative; e.g., it is remote from the VDT 60; i.e., it is not contained within the VDT 60. Therefore, suitable examples include a server in another location or one in the same location as the VDT 60, just not physically part of the VDT 60. In one implementation, the remote server 80 is located at or associated with a vehicle call center—i.e., a facility providing a number of vehicle back-end services and functions and including switches, servers, databases, live advisors, etc., all of which are known in the art.

Now turning to several illustrative methods of using the system and environment described above, in FIG. 4, a flow diagram is shown illustrating a method 400 of establishing a secure diagnostic session. FIG. 4 illustrates the external device 60 (e.g., the VDT) and one of the ECUs 20 having sensitive or confidential information stored therein and a number of steps or transactions involving the VDT and ECU.

The method 400 begins with step 402. In step 402, the VDT is provided a first unique input and a key derivation function (KDF) or algorithm (including PBKDFs or password-based KDFs). The first unique input may be unique to that particular ECU 20 and vehicle 10. Nonlimiting examples of the first unique input include: an encryption key, a password, a passphrase, a function, a salt, a hash, a random number, a constant number, etc., just to list a few examples. As will be appreciated by skilled artisans, the key derivation function or algorithm may be KDF1, KDF2, KDF3, KDF4, PBKDF1, PBKDF2, PBKDF-Schneier, or any other suitable function. Thus, the KDF may have any suitable complexity or strength; and the techniques for implementing and using KDFs also are known to skilled artisans. Both the first unique input and KDF may be stored in memory 62 and may executable using processor 64.

Step 410 may occur before, at the same time as, or after step 402. In step 410, the ECU 20 is provided the same first unique input and the same KDF as the VDT, and similarly here, the first unique input and KDF may be stored in the ECU's memory (32) and may be executable using the ECU's processor (30). The providing steps 402, 410 may be provided by any authorized manufacturer or service facility. And in at least one implementation, the first unique input and KDF may be provided to the ECU at the time of vehicle manufacture. After steps 402 and 410, the method 400 may proceed to step 415.

In step 415, the VDT 60 may initiate a diagnostic session with the ECU 20 over the bus 14. The initiation may include the ECU challenging the VDT, e.g., to ensure that the VDT is an authorized device. For example, step 415 may include the VDT 60 requesting a seed value from the ECU 20 in order to authenticate itself to the ECU.

In response to step 415, the ECU 20 may generate a seed value (step 420). In at least one embodiment, the seed value is numeric, alphabetical, or alpha-numeric. For example, the generation of a seed value may include the use of a random number generator or any other suitable device or software routine. The generated seed value may be stored in ECU memory 32, and the method may continue to step 430.

In step 430, the ECU 20 may provide the seed value to the VDT 60 over the bus 14 and the VDT may store the seed value in its memory 62. The method 400 may proceed to step 437.

Figure 7:
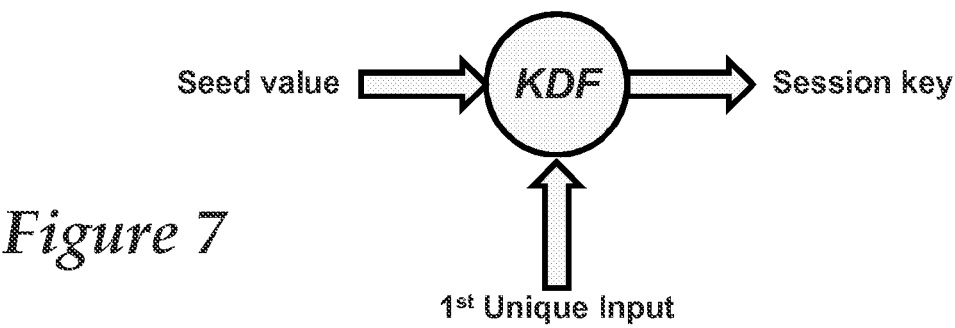

Upon receipt of the seed value (step 430), the VDT 60 in step 437 may determine a session key for the diagnostic session using the seed value. More specifically, both the seed value and the first unique input may be inputs to the KDF and the session key may be a first output, as illustrated in FIG. 7. The session key may be stored in memory 62 for use during the initiated diagnostic session. Following step 437, the method may proceed to step 447.

In step 447, the VDT 60 may re-execute or reiterate the KDF; however, in this instance, the inputs may be the session key (just determined) and a second unique input. Nonlimiting examples of the second unique input include: an encryption key, a password, a passphrase, a function, a salt, a hash, a random number, a constant number, etc., just to list a few examples. Thus, the output of a first iteration of the KDF may be (at least part of) the input of a second iteration of the KDF. The second output of the KDF may be a first challenge response which may be used in step 455.

In step 455, the VDT 60 may provide the first challenge response to the ECU 20 via the bus 14 and thereafter proceed to step 460. It should be appreciated that steps 415, 430, and/or 455 may be performed not only by wired connection, but also using wireless communication as well (e.g., SRWC between the VDT and/or the ECU).

In steps 460 and 465, the ECU 20 may perform steps similar to those performed by the VDT; e.g., in step 460, the ECU 20 may determine a session key using the seed value and first unique input stored in memory 32 as inputs into the KDF and receiving the session key as output (again, FIG. 7). Similar to that performed by the VDT, step 465 may include providing the session key and the second unique input as input to the KDF and receiving a second challenge response as the output (again, FIG. 8). The second unique input may be the same as that used by the VDT and may be provided to the ECU prior to initiating the session. The method 400 then may proceed to step 470.

In step 470, the ECU 20 may determine whether to authenticate the VDT 60; e.g., by determining whether the first challenge response (determined by the VDT) is the same as the second challenge response (determined by the ECU). Namely, the ECU may make a comparison of the values of the first and second challenge responses. If the comparison yields a positive or "TRUE" or "YES"—i.e., if the first response equals the second response—then the method may proceed to step 475. Otherwise, if it yields a negative or "FALSE" or "NO," the method may proceed to step 480.

In step 475 (a "YES"), the diagnostic session is established. During the session, the VDT 60 may acquire diagnostic data and/or services from the ECU 20. Having been properly authenticated, this may include accessing the addresses in memory 32 having sensitive or confidential data or information.

It should be appreciated that according to steps 402-475, the communication between the VDT 60 and the ECU 20 is more secure than conventional diagnostic communications. Firstly, the ECU 20 is not left potentially unlocked (e.g., after the technician conducts diagnostic communications using the VDT); this is due to the fact that the data and/or services communicated from the ECU to the VDT is according to the above-described diagnostic session and the session key expires once the session ends or times out. In addition, the session key is not nakedly sent over the bus 14 where a malicious attacker or eavesdropper may maliciously acquire and use it to access and obtain the ECU's sensitive data. Further, the session key may now be used to encrypt and/or authenticate all subsequent diagnostic messages used for the associated session using various known methods of encryption and authentication.

It also should be appreciated that in method 400, the ECU 20 may not determine the second challenge response before it is provided the first challenge response from the VDT. In this manner, neither the session key nor the challenge response are available at the ECU if the ECU is otherwise maliciously attacked or breached.

If the evaluation in step 470 determines a "NO," then in step 480 the initiated session ends or terminates—that is, no diagnostic session occurs (and no diagnostic data and/or services (sensitive or otherwise) are communicated via the bus 14).

Now turning to FIG. 5, another flow diagram illustrates a method 500 having steps or transactions between the server 80, the VDT 60, and the ECU 20. The method again may be used to establish a secure diagnostic session. In this implementation, many of the steps may be identical to those described with respect to FIG. 4; therefore, similar reference numerals denote like elements and these will not be re-described below.

The method 500 begins with step 505 wherein the first unique input and the KDF is provided to the server 80. This step may be similar to that described with respect to step 402. Also, in step 510, the first unique input and KDF may be again provided to the ECU 20. As before, steps 505 and 510 may occur in any order or simultaneously.

Steps 520 and 530 are identical to steps 420 and 430—including e.g., the ECU generates a seed value and the ECU provides the seed value to the VDT 60. Step 535 follows.

In step 535, the VDT 60 provides the seed value to the server 80. The server may store the seed value in memory 82. Step 535 may be conducted by wire (e.g., via a networked computer and a secure internet connection), via SRWC between the VDT and server 80, or via cellular communication between the VDT and server, just to name a few examples. In any instance, the server 80 receives and stores the seed value and the method proceeds to step 540.

Figure 8:
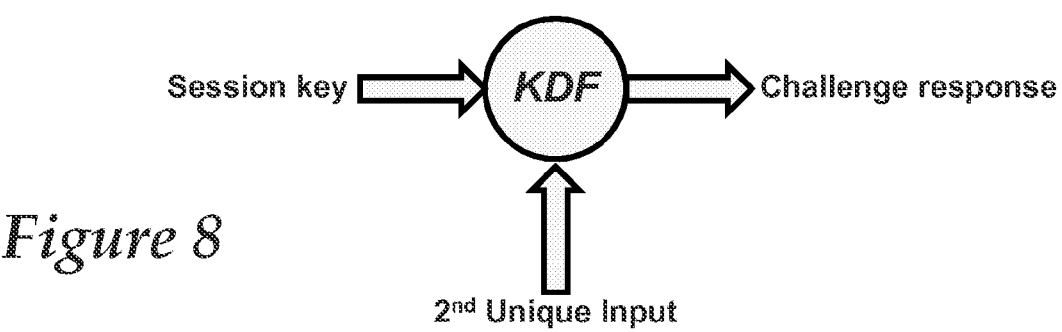
FIG. 8 is a schematic diagram illustrating inputs and an output of another KDF.

In steps 540 and 545, the server 80 performs steps similar to steps 437 and 447—including e.g., determining a session key (per FIG. 7) and a first challenge response (per FIG. 8). And in step 550, the server 80 provides the first challenge response to the VDT (e.g., via the same means described above or other suitable means).

Steps 555, 560, 565, 570, 575, and 580 of method 500 all correlate to steps 455, 460, 465, 470, 475, and 480, respectively, of method 400. Thus, in method 500, the VDT 60 communicates to the ECU 20 the first challenge response determined at the server 80. In this method, the first unique input is not carried or stored by a portable device such as the VDT 60. Therefore, even if the VDT is stolen, the first unique input remains safe and/or secret from malicious attackers. It will be appreciated that similar to method 400, method 500 never communicates the session key openly over the bus 14 or over the communication link between the VDT 60 and the server 80.

Now turning to method 600, FIG. 6 illustrates yet another method for establishing a secure diagnostic session. Many of the steps are identical to those described with respect to FIG. 5 (and FIG. 4); therefore, similar reference numerals denote like elements and these will not be re-described below.

The method 600 begins with steps 605, 610 and 607. In steps 605 and 610, the server 80 and ECU 20 (respectively) are provided the first unique input and KDF (as in method 500). In step 607, the VDT is provided the KDF, but not the first unique input. These steps may occur in any order. As in method 500, the first unique input is not stored at the VDT 60 in order to increase security. After these steps, the method 600 proceeds to steps 615, 620, 630, 635, and 640—which are all the same as those described above with respect to method 500 (namely, steps 515, 520, 530, 535, and 540, respectively).

Following step 640 (the server's determination of a session key), the server provides the session key to the VDT 60 (step 642). Step 642 may be conducted securely by wire (e.g., via a networked computer), via SRWC between the VDT and server 80, or via cellular communication between the VDT and server, just to name a few examples. The security of the transmission may include encryption or any other suitable means of protecting the session key. For example, in at least one implementation, a communication of the session key (and any other communications between the VDT and server 80) may be over a secure internet connection. The method then proceeds to step 647.

In step 647, the VDT 60 determines the first challenge response using the session key, the seed value, and the KDF. This step may be similar to step 447 (method 400)—e.g., the inputs and output being similar to that shown in FIG. 8 The method then proceeds to steps 655.

Steps 655, 660, 665, 670, 675, and 680 may be the same as steps 555, 560, 565, 570, 575, and 580, respectively. Thus, method 600 also avoids transmission of the session key between the VDT 60 and ECU 20, where the session key might be intercepted by a malicious eavesdropper.

Thus, there has been described several methods for establishing a secure diagnostic session between a vehicle electronic control unit (ECU) and an external device such as a vehicle diagnostics tool. More specifically, the disclosure presents methods for the diagnostics tool to authenticate itself to the ECU without a session key being communicated between the ECU and tool or over the vehicle bus connecting the two devices.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of establishing a secure diagnostic session at a vehicle, comprising the steps of:
   providing a seed value from an electronic control unit (ECU) to a vehicle diagnostics tool (VDT);
   in response to providing the seed value to the VDT, receiving at the ECU a first challenge response;
   determining a session key at the ECU using the seed value as an input to a first key derivation function (KDF);
   determining a second challenge response using the session key as an input to a second KDF;
   determining at the ECU whether the first challenge response is valid based on the second challenge response; and
   when the first challenge response is valid, then initiating at the ECU a diagnostic session between the VDT and the ECU.

2. The method of claim 1, wherein the input to the first KDF includes a unique input value and the seed value, wherein the input to the second KDF includes another unique input value and the session key.

3. The method of claim 1, wherein the validation determination includes comparing the first challenge response to the second challenge response.

4. The method of claim 1, wherein the validation determination further comprises:
   determining a second session key at the VDT using the KDF based on the seed value and a first unique input value; and
   determining the second challenge response at the VDT using the KDF based on the second session key and a second unique input value.

5. The method of claim 1, wherein the VDT determines the first challenge response before the ECU determines the second challenge response.

6. A method of establishing a secure diagnostic session at a vehicle, comprising the steps of:
   receiving at a vehicle diagnostic tool (VDT) a seed value generated by a vehicle electronic control unit (ECU), wherein the seed value is used to authenticate the VDT to the ECU;
   providing to a remote server the seed value from the VDT;
   in response to providing the seed value to the remote server, receiving one of a session key or a challenge response at the VDT, wherein the session key or the challenge response is associated with the seed value;
   when the session key is received at the VDT, then determining the challenge response at the VDT using the session key as input;
   providing from the VDT the challenge response to the ECU; and
   in response to providing the challenge response to the ECU, conducting a diagnostic session between the VDT and the ECU.

7. The method of claim 6, wherein the remote server determines the session key using a first unique input, wherein a second unique input is used by one of the remote server or the VDT to determine the challenge response.

8. The method of claim 7, wherein the first unique input and the seed value are inputs to a first key derivation function (KDF), wherein the second unique input and the session key are inputs to a second KDF.

9. The method of claim 8, wherein the first KDF is the same as the second KDF.

10. The method of claim 6, wherein the ECU independently determines the session key and the challenge response using a key derivation function (KDF), wherein the diagnostic session is conducted after the ECU determines that the challenge response determined at the ECU is the same as the challenge response provided by the VDT.

11. The method of claim 6, wherein the remote server or the VDT determines the challenge response before the ECU determines the corresponding challenge response.

12. The method of claim 6, wherein communication between the VDT and the remote server is over a secure internet connection.

13. A vehicle diagnostic tool (VDT) used to establish a secure diagnostic session at a vehicle, comprising:
   a processor; and
   memory having instructions stored thereon which are executable by the processor, wherein the instructions are adapted to establish a secure diagnostic session with an electronic control unit (ECU) in the vehicle,
   wherein the instructions comprise:
      receiving a seed value from the ECU;
      determining a challenge response using the seed value using a key derivation function (KDF);
      transmitting the challenge response to the ECU; and
      conducting the secure diagnostic session with the ECU when the ECU validates the challenge response,
      wherein the determination of the challenge response includes one of the following:
         (1) providing the seed value as input to the KDF and receiving a session key as output at the VDT, and then providing the session key an input to the KDF at the VDT and receiving the challenge response as output; or
         (2) providing the seed value to a remote server, and in response, receiving one of the session key or the challenge response, wherein when the session key is received in response, providing the session key as input to the KDF at the VDT to determine the challenge response.

* * * * *